(12) United States Patent
Chi et al.

(10) Patent No.: US 11,302,998 B2
(45) Date of Patent: Apr. 12, 2022

(54) BUS BAR ASSEMBLY FOR ELECTRODE LEAD BONDING AND BATTERY MODULE INCLUDING SAME

(71) Applicant: LG Chem, Ltd., Seoul (KR)

(72) Inventors: Ho-June Chi, Daejeon (KR);
Kyung-Mo Kim, Daejeon (KR);
Jeong-O Mun, Daejeon (KR);
Jin-Yong Park, Daejeon (KR);
Jung-Hoon Lee, Daejeon (KR)

(73) Assignee: LG Energy Solution, Ltd.

( * ) Notice: Subject to any disclaimer, the term of this patent is extended or adjusted under 35 U.S.C. 154(b) by 208 days.

(21) Appl. No.: 16/617,115

(22) PCT Filed: Sep. 3, 2018

(86) PCT No.: PCT/KR2018/010232
§ 371 (c)(1),
(2) Date: Nov. 26, 2019

(87) PCT Pub. No.: WO2019/074206
PCT Pub. Date: Apr. 18, 2019

(65) Prior Publication Data
US 2020/0350547 A1     Nov. 5, 2020

(30) Foreign Application Priority Data
Oct. 10, 2017   (KR) .................. 10-2017-0129091

(51) Int. Cl.
*H01M 4/00*       (2006.01)
*H01M 50/502*     (2021.01)
(Continued)

(52) U.S. Cl.
CPC ......... *H01M 50/502* (2021.01); *H01M 50/20* (2021.01); *H01M 50/503* (2021.01);
(Continued)

(58) Field of Classification Search
CPC ............ H01M 50/502; H01M 50/528; H01M 50/531; H01M 50/516; H01M 50/522;
(Continued)

(56) References Cited

U.S. PATENT DOCUMENTS

2014/0212732 A1   7/2014   Ichikawa et al.
2014/0356691 A1   12/2014  Ahn
(Continued)

FOREIGN PATENT DOCUMENTS

CN      103986038 A    8/2014
CN      104412417 A    3/2015
(Continued)

OTHER PUBLICATIONS

Extended European Search Report for Application No. 18866237.3 dated Jul. 2, 2020, 5 pages.
(Continued)

*Primary Examiner* — Jane J Rhee
(74) *Attorney, Agent, or Firm* — Lerner, David, Littenberg, Krumholz & Mentlik, LLP (57) ABSTRACT

A bus bar assembly for electrically connecting a plurality of battery cells having electrode leads includes a fixed bus bar provided in the form of a rod-shaped conductor; a pair of movable bus bars disposed to be spaced from both sides of the fixed bus bar in a lateral direction with the fixed bus bar being interposed therebetween to form a fitting space respectively between the pair of movable bus bars and the fixed bus bar so that at least one electrode lead can be inserted therein; and an adhering member configured to move the pair of movable bus bars close to the fixed bus bar when an electrode lead is located in each fitting space so that the electrode leads can be adhered to the fixed bus bar.

13 Claims, 8 Drawing Sheets

(51) Int. Cl.
*H01R 4/02* (2006.01)
*H01R 4/48* (2006.01)
*H01M 50/20* (2021.01)
*H01M 50/531* (2021.01)
*H01M 50/503* (2021.01)
*H01M 50/516* (2021.01)
*H01M 50/522* (2021.01)
*H01M 50/528* (2021.01)

(52) U.S. Cl.
CPC ....... *H01M 50/516* (2021.01); *H01M 50/522* (2021.01); *H01M 50/528* (2021.01); *H01M 50/531* (2021.01); *H01R 4/029* (2013.01); *H01R 4/4809* (2013.01)

(58) Field of Classification Search
CPC .... H01M 50/503; H01M 50/20; H01R 4/029; H01R 4/4809
See application file for complete search history.

(56) References Cited

U.S. PATENT DOCUMENTS

| | | |
|---|---|---|
| 2015/0171401 A1 | 6/2015 | Kim et al. |
| 2015/0214532 A1* | 7/2015 | Nakayama ......... H01M 50/528 429/50 |
| 2015/0303415 A1 | 10/2015 | Kayano et al. |
| 2016/0233476 A1 | 8/2016 | Okamoto et al. |
| 2016/0248068 A1 | 8/2016 | Ha |
| 2020/0067066 A1* | 2/2020 | Kim ................... H01M 50/543 |

FOREIGN PATENT DOCUMENTS

| | | |
|---|---|---|
| CN | 104769746 A | 7/2015 |
| JP | H1125951 A | 1/1999 |
| JP | 2007035311 A | 2/2007 |
| JP | 2007087907 A | 4/2007 |
| JP | 2011090812 A | 5/2011 |
| JP | 2013206844 A | 10/2013 |
| JP | 2014002905 A | 1/2014 |
| JP | 2014053104 A | 3/2014 |
| JP | 2015141867 A | 8/2015 |
| JP | 2016157670 A | 9/2016 |
| KR | 20140091102 A | 7/2014 |
| KR | 20140093424 A | 7/2014 |
| KR | 20140140744 A | 12/2014 |
| KR | 20150137840 A | 12/2015 |
| KR | 20160097013 A | 8/2016 |
| KR | 20170078359 A | 7/2017 |
| KR | 20170087084 A | 7/2017 |

OTHER PUBLICATIONS

Search report from International Application No. PCT/KR2018/010232, dated Dec. 11, 2018.
Search Report Chinese Appl. No. 201880036437.7 dated Oct. 11, 2021. 4 pgs.

* cited by examiner

BUS BAR ASSEMBLY FOR ELECTRODE LEAD BONDING AND BATTERY MODULE INCLUDING SAME

CROSS-REFERENCE TO RELATED APPLICATIONS

The present application is a national phase entry under 35 U.S.C. § 371 of International Application No. PCT/KR2018/010232, filed Sep. 3, 2018, published in Korean, which claims priority to Korean Patent Application No. 10-2017-0129091 filed on Oct. 10, 2017 in the Republic of Korea, the disclosures of which are incorporated herein by reference.

TECHNICAL FIELD

The present disclosure relates to a bus bar assembly for joining an electrode lead and a battery module including the bus bar assembly, and more particularly, to a bus bar assembly capable of coupling electrode leads to a bus bar without bending the coupling electrode, and a battery module including the bus bar assembly.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. The lithium secondary battery includes an electrode assembly in which a positive electrode plate coated with the positive electrode active material and a negative electrode plate coated with the negative electrode active material are disposed with a separator being interposed therebetween, and an exterior, namely a pouch exterior, sealably containing the electrode assembly together with an electrolyte.

Generally, the lithium secondary battery may be classified into a can-type secondary battery in which an electrode assembly is included in a metal can and a pouch-type secondary battery in which an electrode assembly is included in a pouch made of an aluminum sheet, depending on the shape of the exterior.

Recently, secondary batteries have been widely used not only in small-sized devices such as portable electronic devices, but also in electric vehicles that require a driving power by using internal combustion engines and/or electric motors. The electric vehicles include hybrid electric vehicles, plug-in hybrid electric vehicles, and pure electric vehicles powered only by an electric motor and a battery without an internal combustion engine.

When the secondary batteries are used in the electric vehicle, a large number of secondary batteries are electrically connected to increase capacity and power. In particular, pouch-type secondary batteries are widely used for the middle-sized or large-sized devices since they may be easily stacked. Thus, typically, the battery module/pack of the middle-sized or large-sized device is implemented by connecting the pouch-type secondary batteries in series and/or in parallel.

Figure 1:
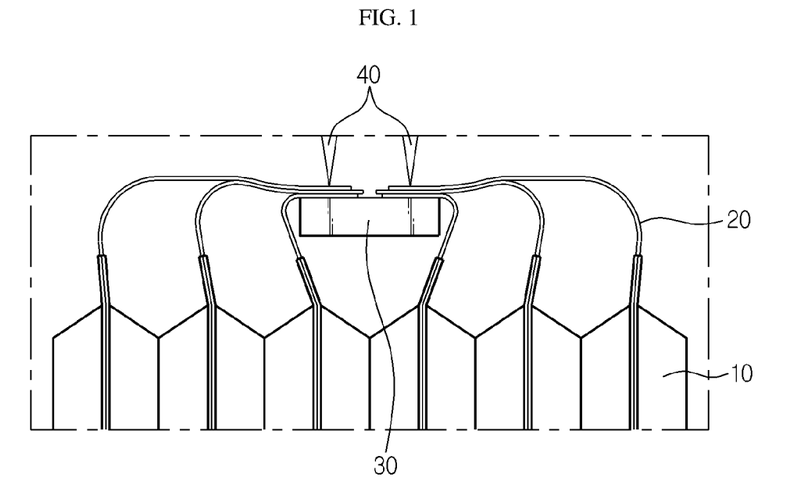
FIG. 1 is a diagram schematically showing a conventional joining configuration of electrode leads and a bus bar.

Meanwhile, when the battery module is configured, electrode leads 20 of a pouch-type secondary battery 10 are bent, as shown in FIG. 1, and brought into contact with an upper end surface of a bus bar, and then joined thereto by welding 40. Here, the bus bar is a rod-shaped conductor made of copper, silver, tin-plated copper or the like and having a rod shape. The bus bar may safely supply a large amount of current to the bus, compared to a copper wire, and thus the bus bar is widely used as a wiring member in a power supply device including a battery module of an electric vehicle.

However, in the conventional technique, a large number of manual operations by a worker are required to maintain the bending shape of the electrode leads 20, and the electrode leads 20 and the bus bar 30 are not easily adhered to each other due to the elastic restoration force of the electrode leads 20 made of a metal material.

In particular, when three or more electrode leads are connected in parallel, a plurality of electrode leads should be overlapped on the bus bar, which makes the welding work more difficult and deteriorates the welding quality.

DISCLOSURE

Technical Problem

The present disclosure is designed to solve the problems of the related art, and therefore the present disclosure is directed to providing a bus bar assembly, which may couple electrode leads to a bus bar without bending the electrode leads so that the electrode leads and the bus bar are adhered, and a battery module including the bus bar assembly.

However, the objects of the present disclosure are not limited to the above, and objects not mentioned herein may be clearly understood from the present specification by those skilled in the art.

Technical Solution

In one aspect of the present disclosure, there is provided a bus bar assembly for electrically connecting a plurality of battery cells having electrode leads, the bus bar assembly comprising: a fixed bus bar provided in the form of a rod-shaped conductor; a pair of movable bus bars disposed to be spaced from both sides of the fixed bus bar in a lateral direction with the fixed bus bar being interposed therebetween to form a fitting space respectively between the pair of movable bus bars and the fixed bus bar so that at least one electrode lead can be inserted therein; and an adhering member configured to move the pair of movable bus bars closer to the fixed bus bar when an electrode lead is located in each fitting space so that the electrode leads can be adhered to the fixed bus bar.

Each of the pair of movable bus bars may include an adhering portion provided in parallel to the fixed bus bar and gap adjusting portions bent at both side ends of the adhering portion and extending therefrom, and the pair of movable bus bars may be disposed symmetric to each other with the fixed bus bar being interposed therebetween to surround a periphery of the fixed bus bar.

The adhering member may be a leaf spring having both ends respectively coupled to the pair of movable bus bars to move the pair of movable bus bars in directions facing each other by an elastic restoration force.

The leaf spring may include a pair of leaf springs, and both ends of each of the pair of leaf springs may be coupled to end portions of the gap adjusting portions, respectively, which face each other at the pair of movable bus bars.

The bus bar assembly may further comprise a bus bar support frame serving as a plate-shaped structure and having a slit formed at a location corresponding to each fitting space so that the electrode lead can pass therethrough, the bus bar support frame supporting the pair of movable bus bars and the fixed bus bar so that the pair of movable bus bars are movable with respect to the fixed bus bar.

The bus bar support frame may include a gap keeping protrusion configured to be inserted between the gap adjusting portions of the pair of movable bus bars or released therefrom.

The bus bar support frame may further include a cantilever beam having a free end located at the gap adjusting portion, and the gap keeping protrusion may be provided at the free end.

The cantilever beam may further include a pressing protrusion protruding at a location spaced apart from the gap keeping protrusion.

The bus bar support frame may further include corner brackets configured to surround and support four corner portions of the pair of movable bus bars in a state where the pair of movable bus bars are spaced farthest from both sides of the fixed bus bar in the lateral direction.

In another aspect of the present disclosure, there is also provided a battery module, comprising the bus bar assembly described above. The battery module may be used as an energy source of electric vehicles, hybrid electric vehicles or power storage devices.

Advantageous Effects

According to the present disclosure, it is possible to provide a bus bar assembly, which may couple electrode leads to a bus bar without bending the electrode leads so that the electrode leads and the bus bar are adhered, and a battery module including the bus bar assembly.

In addition, since all of the electrode leads may be welded in a mechanically compressed state, the electrical connection and the mechanical bonding strength reliability may be improved regardless of the number of electrode leads in a parallel connection structure.

Moreover, since the manual process for bending the electrode leads is eliminated, the automation rate of the battery module production line may be improved.

The effects of the present disclosure are not limited to the above, and effects not mentioned herein may be clearly understood from the present specification and the accompanying drawings by those skilled in the art.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

The embodiments disclosed herein are provided for more perfect explanation of the present disclosure, and thus the shape, size and the like of components may be exaggerated, omitted or simplified in the drawings for better understanding. Thus, the size and ratio of components in the drawings do not wholly reflect the actual size and ratio.

Figure 2:
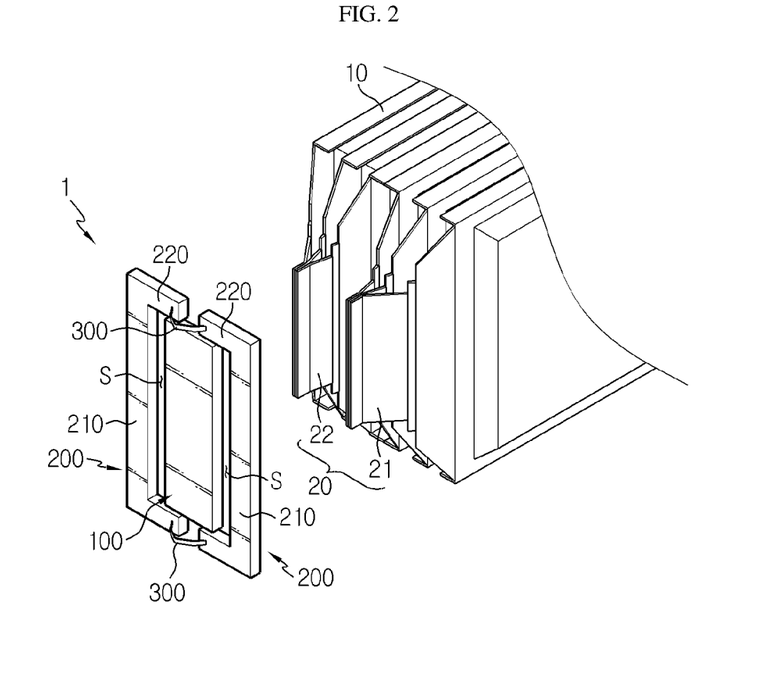
FIGS. 2 and 3 are perspective views schematically showing main components of a bus bar assembly according to an embodiment of the present disclosure and a battery cell stack.
Figure 3:
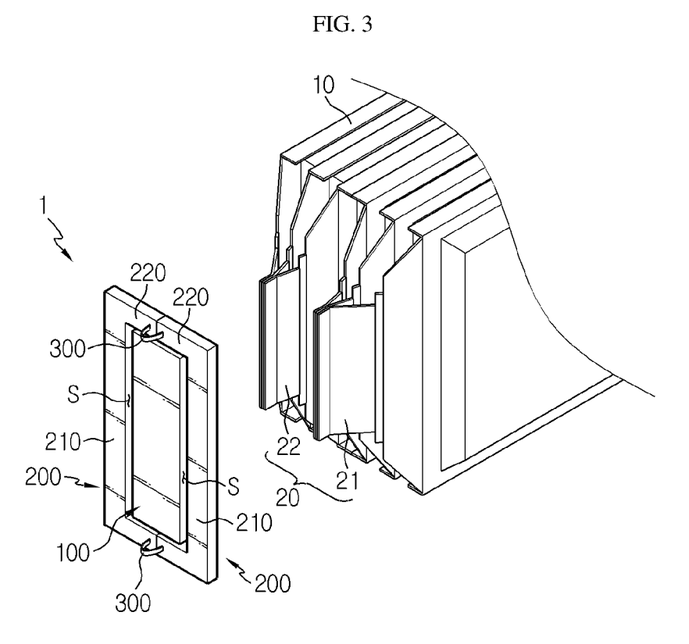

FIGS. 2 and 3 are perspective views schematically showing main components of a bus bar assembly according to an embodiment of the present disclosure and a battery cell stack.

Referring to FIGS. 2 and 3, the bus bar assembly 1 according to an embodiment of the present disclosure is a bus bar assembly 1 for electrically connecting electrode leads 20 of a plurality of battery cells 10, and may include a fixed bus bar 100, a pair of movable bus bars 200, and an adhering member 300 for allowing relative movements of the pair of movable bus bars 200 relative to the fixed bus bar 100.

The electrode lead 20 of the battery cell 10 includes a positive electrode lead 21 and a negative electrode lead 22. As will be described in more detail below, according to the present disclosure, the positive electrode lead 21 and the negative electrode lead 22 are inserted directly into a fitting space S of the bus bar assembly 1 according to the present disclosure, and end portions of the positive electrode lead 21 and the negative electrode lead 22 may be clamped and then welded by the bus bar assembly 1. Thus, it is unnecessary to perform the bending process of the electrode lead 20 as in the prior art, thereby increasing the automation ratio of the production line. Also, according to the present disclosure, the electrode leads 20 may be welded under mechanical compression. Thus, even when two or more electrode leads 20 are joined in parallel, it is possible to maintain the reliability of electrical connection and the mechanical bonding strength.

Hereinafter, the bus bar assembly 1 according to the present disclosure will be described in detail.

First, the fixed bus bar 100 may be made of a rod-shaped material such as copper, silver, and tin-plated copper with electrical conductivity. The fixed bus bar 100 may allow safe passage of high capacity currents. The positive electrode leads 21 and the negative electrode leads 22 may be adhered and welded to the fixed bus bar and thus be electrically connected thereto. For example, six battery cells 10 may be connected in total so that three battery cells are connected in parallel therein. As shown in FIGS. 2 and 3, the positive electrode leads of three battery cells are overlapped and the negative electrode leads of the other three battery cells are overlapped. Then, end portions of the positive electrode leads and the negative electrode leads are inserted into the fitting space S, and then the end portions are adhered and welded to both side surfaces of the fixed bus bar 100 so as to be electrically connected thereto.

The pair of movable bus bars 200 may be made of a metal such as copper, silver, tin plating, or copper with electrical conductivity, similar to the fixed bus bar 100.

The pair of movable bus bars 200 may be spaced apart from both sides of the fixed bus bar 100 with the fixed bus bar 100 being interposed therebetween, thereby forming the fitting space S respectively between the pair of movable bus bars 200 and the fixed bus bar 100. That is, the fitting space S is formed at two places at both sides of the fixed bus bar 100.

In addition, the pair of movable bus bars 200 may be provided so as to be movable in the horizontal, i.e. lateral, direction with respect to the fixed bus bar 100. The pair of movable bus bars 200 may be disposed to be spaced apart from both sides of the fixed bus bar 100 as shown in FIG. 2 and move closer to the fixed bus bar 100 as shown in FIG. 3. Thus, the width of the fitting space S may be adjusted according to the horizontal movement of the pair of movable bus bars 200, and the electrode leads 20 inserted in this fitting space S may mechanically compressed by the fixed bus bar 100 and the pair of movable bus bars 200.

More specifically, the movable bus bar 200 of this embodiment may include an adhering portion 210 and gap adjusting portions 220 in an approximately "⊂" shape.

The adhering portion 210 may be defined as a portion disposed in parallel with the fixed bus bar 100, and the gap adjusting portions 220 may be defined as portions extending from the both side ends of the adhering portion 210 toward the fixed bus bar 100.

The movable bus bar 200 is provided in a pair, and the pair of movable bus bars 200 may be disposed symmetrically to each other with the fixed bus bar 100 being interposed therebetween to surround a periphery of the fixed bus bar 100. At this time, the fitting spaces S may be formed between the two adhering portions 210 and both sides of the fixed bus bar 100, so that the gap adjusting portion 220 of one movable bus bar 200 may be in contact with the gap adjusting portion 220 of the other movable bus bar 200. Thus, the pair of movable bus bars 200 may be electrically connected to each other. In addition, the width of the fitting space S may be determined according to the length of the gap adjusting portion 220.

Meanwhile, unlike this embodiment, the movable bus bar 200 is configured to form the fitting space S and press the electrode lead 20, so the movable bus bar 200 may not necessarily be made of an electrically conductive material. That is, since the positive electrode leads 21 and the negative electrode leads 22 may be sufficiently electrically connected using the fixed bus bar 100, the movable bus bar 200 may be made of an insulating material, different from the fixed bus bar 100. If the movable bus bar 200 is made of an insulating material as an alternative embodiment, a better effect may be obtained in preventing an electrical short circuit inside the battery module.

The adhering member 300 moves the pair of movable bus bars 200 close to the fixed bus bar 100 so that the electrode lead 20 is adhered to the fixed bus bar 100.

The adhering member 300 of this embodiment may be a leaf spring 300 that has both ends respectively coupled to the pair of movable bus bars 200 to move the pair of movable bus bars 200 in directions facing each other by means of an elastic restoration force.

For example, referring to FIGS. 2 and 3, the leaf spring 300 may be coupled to the gap adjusting portion 220 of the movable bus bar 200. At this time, one end of the leaf spring 300 may be coupled to the movable bus bar 200 at the left side, and the other end of the leaf spring 300 may be coupled to the movable bus bar 200 at the right side. More specifically, the leaf spring 300 is provided in a pair, and both ends of the pair of leaf springs 300 may be coupled to the end portions of the gap adjusting portions 220, which are respectively located at the upper and lower portions of the fixed bus bar 100 and face each other.

As shown in FIG. 2, the leaf spring 300 is in a widened state due to an external force. However, if the external force disappears as shown in FIG. 3, the leaf spring 300 returns to the original state by means of the elastic restoration force. The movable bus bar 200 may move close to the fixed bus bar 100 by the above operation of the leaf spring 300.

Figure 4:
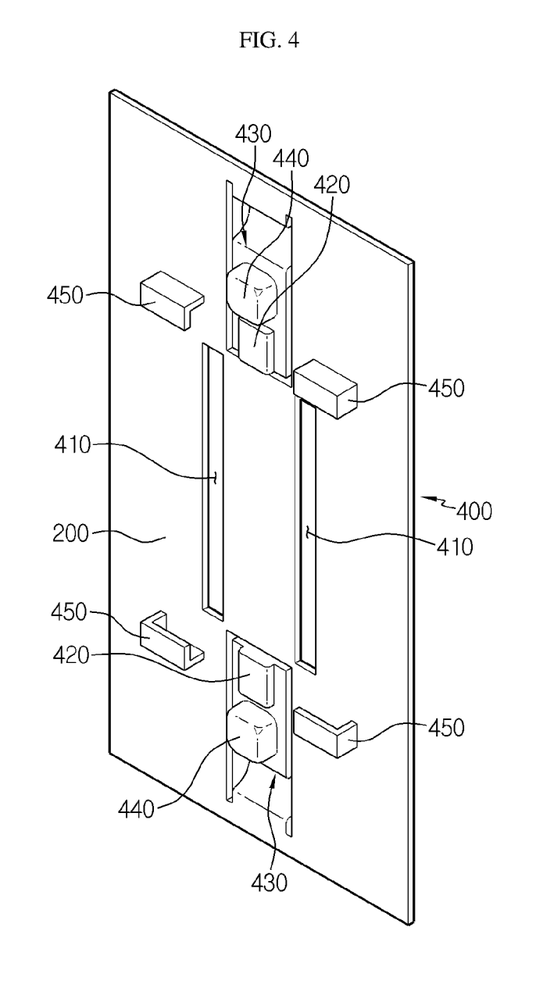
FIG. 4 is a perspective view showing a bus bar support frame according to an embodiment of the present disclosure.
Figure 5:
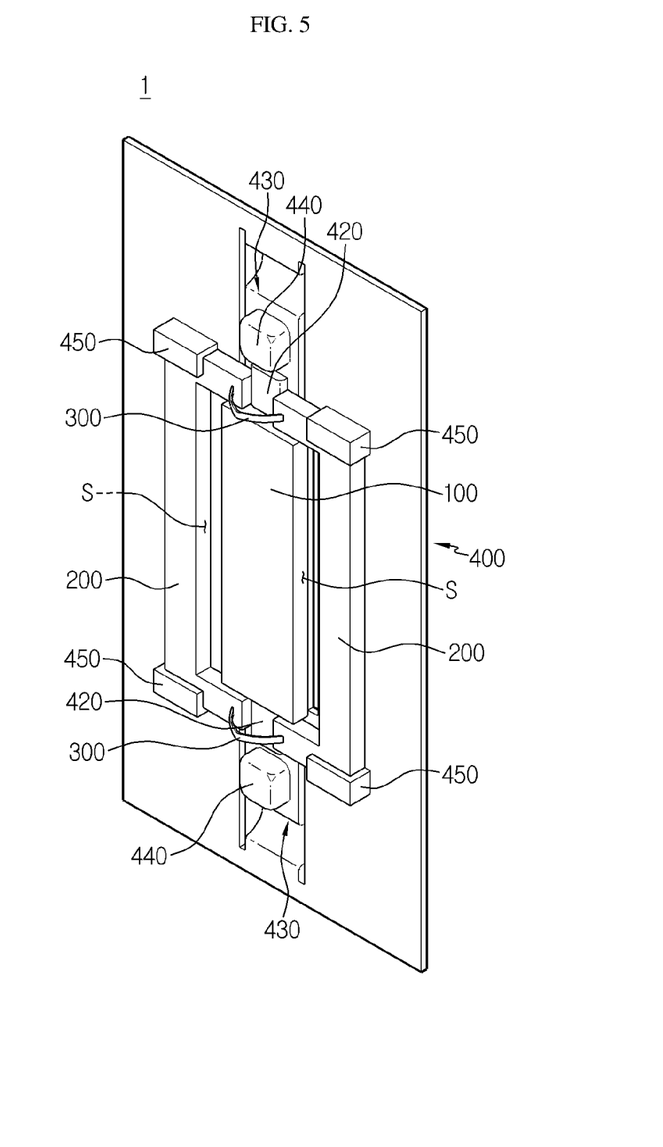
FIG. 5 is a perspective view showing the bus bar assembly according to an embodiment of the present disclosure before the electrode leads are inserted.
Figure 6:
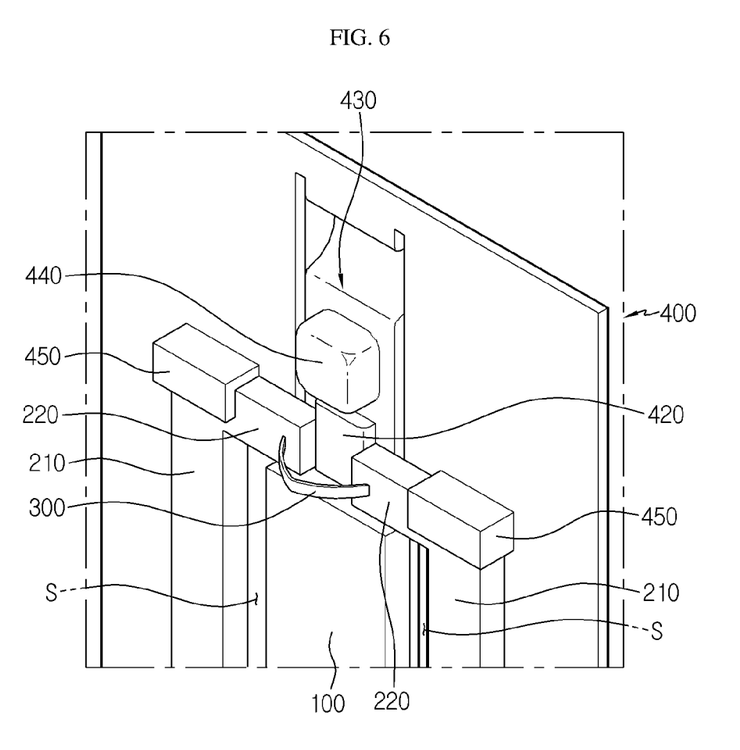
FIG. 6 is an enlarged view showing a main portion of FIG. 5.
Figure 7:
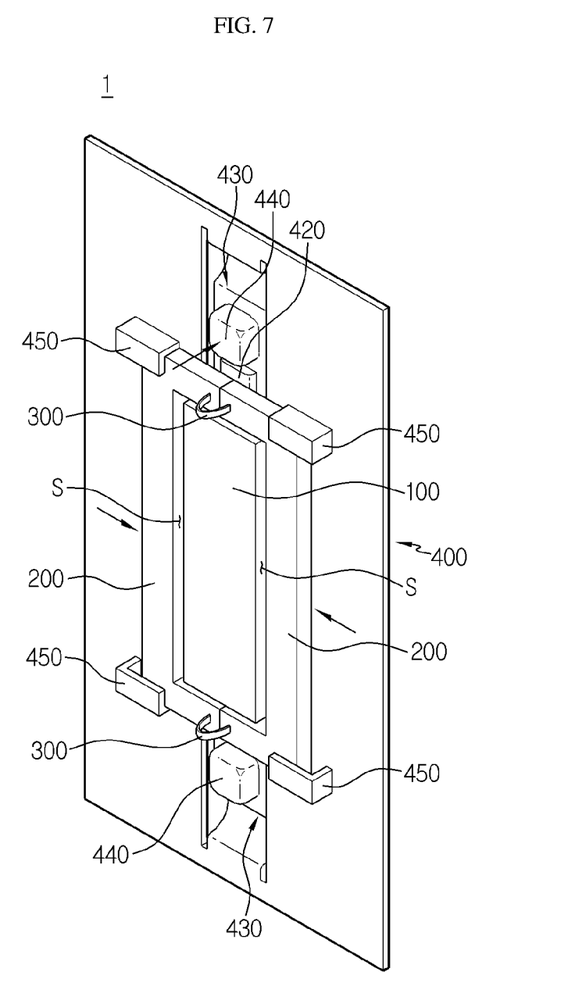
FIG. 7 is a perspective view showing the bus bar assembly according to an embodiment of the present disclosure after the electrode leads are inserted.
Figure 8:
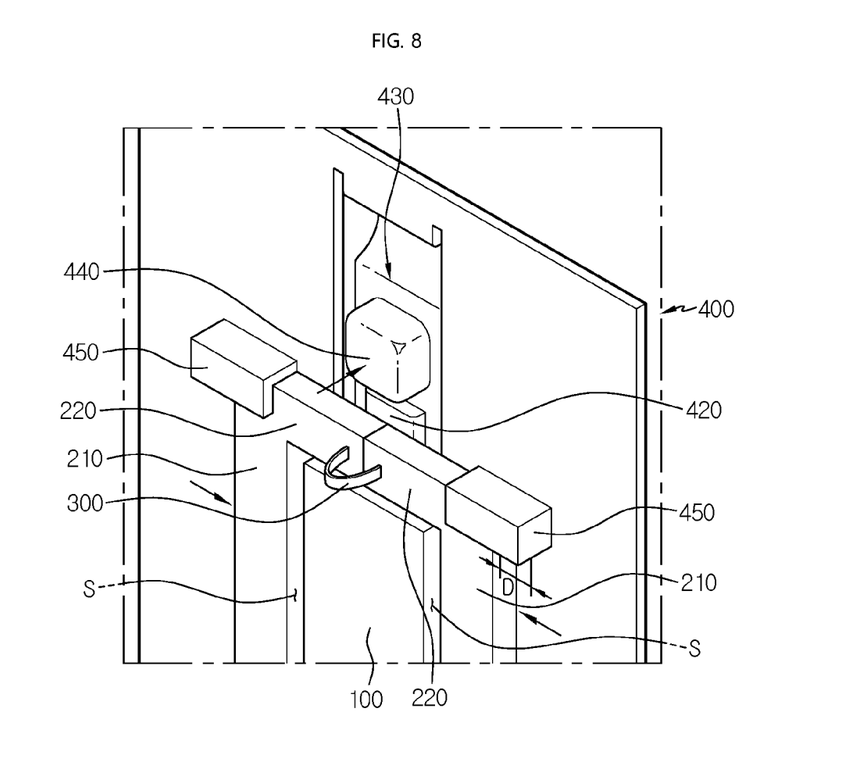
FIG. 8 is an enlarged view showing a main portion of FIG. 7.

FIG. 4 is a perspective view showing a bus bar support frame according to an embodiment of the present disclosure, FIGS. 5 and 6 are a perspective view and an enlarged view showing the bus bar assembly according to an embodiment of the present disclosure before the electrode leads are inserted, and FIGS. 7 and 8 are a perspective view and an enlarged view showing the bus bar assembly according to an embodiment of the present disclosure after the electrode leads are inserted.

Referring to FIGS. 4 to 8, the bus bar assembly 1 according to the present disclosure may further include a bus bar support frame 400 that gives a place where the fixed bus bar 100 and the pair of movable bus bars 200 may be supported.

The bus bar support frame 400 may be attached to the front or rear surfaces of a stack of the battery cells 10. For example, the battery cell stack may be accommodated in a module housing (not shown). The module housing may be provided in a tubular shape having open front and rear surfaces, and bus bar support frames 400 may be respectively coupled to the front and rear surfaces of the module housing and be located at the front and rear surfaces of the battery cell stack.

As shown in FIG. 4, the bus bar support frame 400 is a plate-shaped structure and has a slit 410 formed between the fixed bus bar 100 and the pair of movable bus bars 200 at a location corresponding to the fitting space S so that the electrode lead 20 may pass therethrough. Also, the slit 410 is provided to support the bus bars so that the pair of movable bus bars 200 are horizontally movable relative to the fixed bus bar 100.

For this, the bus bar support frame 400 may further include a gap keeping protrusion 420, a cantilever beam 430 and a corner bracket 450.

First, the gap keeping protrusion 420 allows the pair of movable bus bars 200 to be spaced apart from both sides of the fixed bus bar 100 in order to secure the fitting space S sufficiently.

As shown in FIGS. 5 to 8, the gap keeping protrusion 420 may be provided to be inserted between the gap adjusting portions 220 of the pair of movable bus bars 200 and to be released therefrom.

In other words, the gap keeping protrusion 420 may be interposed between the gap adjusting portions 220 of the movable bus bars 200 which are pulled apart from each other. If the gap keeping protrusion 420 is interposed between the gap adjusting portions 220, the leaf spring 300 may be kept open. Accordingly, the fitting space S may be sufficiently secured, and a plurality of electrode leads 20 may be disposed to be inserted therein.

In addition, the gap keeping protrusion 420 may have a cantilever beam 430. In this case, if the cantilever beam 430 is lightly pressed, the gap keeping protrusion 420 may be inserted between the gap adjusting portions 220 or released therefrom.

One end of the cantilever beam 430 is fixed, and the other end thereof is in a free state, and the free end of the cantilever beam 430 may be located at the rear of the gap adjusting portion 220. The cantilever beam 430 may be formed by cutting a portion of a plate surface of the bus bar support frame 400, and the gap keeping protrusion 420 may be provided on the free end of the cantilever beam 430.

In addition, the cantilever beam 430 may further include a pressing protrusion 440 formed to protrude at a location spaced apart from the gap keeping protrusion 420. The pressing protrusion 440 is provided for pushing the cantilever beam 430 more easily. For example, if the pressing protrusion 440 is pressed by a welding jig (not shown) before the electrode lead 20 is welded, the cantilever beam 430 is tilted back and the gap keeping protrusion 420 is moved from being between the gap adjusting portions 220 of the movable bus bars 200. Also, an elastic restoration force may be applied so that the gap adjusting portions 220 of the movable bus bars 200 are brought into contact with each other. In this case, the fitting space S is narrowed so that the electrode leads 20 interposed therebetween may be tightly adhered to the fixed bus bar 100 and the pair of movable bus bars 200.

Meanwhile, the fixed bus bar 100 is fixedly attached onto the bus bar support frame 400, but the movable bus bar 200 should be movably attached onto the bus bar support frame 400.

The corner bracket 450 of the bus bar support frame 400 serves to support the movable bus bar 200 while allowing the movability of the movable bus bar 200.

In this embodiment, four corner brackets 450 are provided, and the four corner brackets 450 are positioned at corner portions of the movable bus bar 200 to restrict the movable bus bar 200 movably. Specifically, the corner brackets 450 may be configured to surround four corner portions of the pair of movable bus bars 200 in a state where the pair of movable bus bars 200 are spaced farthest from both sides of the fixed bus bar 100, namely where the gap keeping protrusions 420 are inserted therein. In other words, the four corner brackets 450 restrain the pair of movable bus bars 200 in upper, lower, left and right directions. Here, for example, a movement allowance space is provided as indicated by D in FIG. 8, so that movable bus bar 200 is movable within the movement allowance space of the corner bracket 450.

Figure 9:
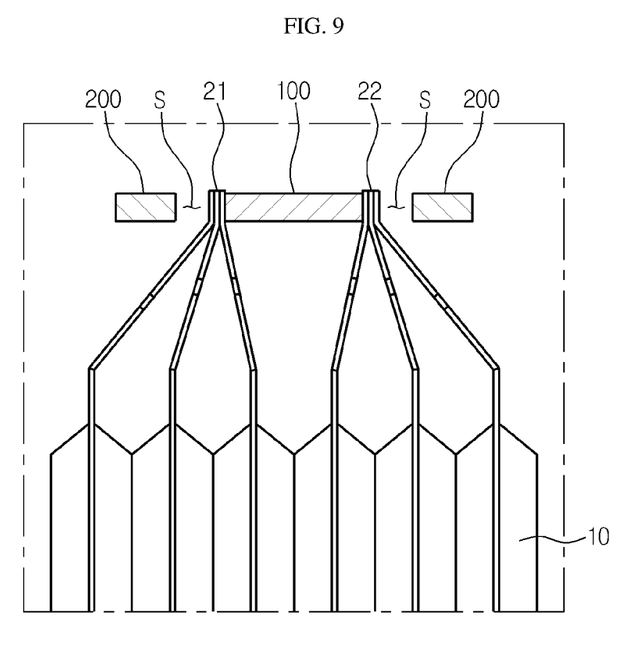
FIGS. 9 and 10 are diagrams showing the configurations before and after the electrode leads and the bus bar assembly are joined according to an embodiment of the present disclosure.
Figure 10:
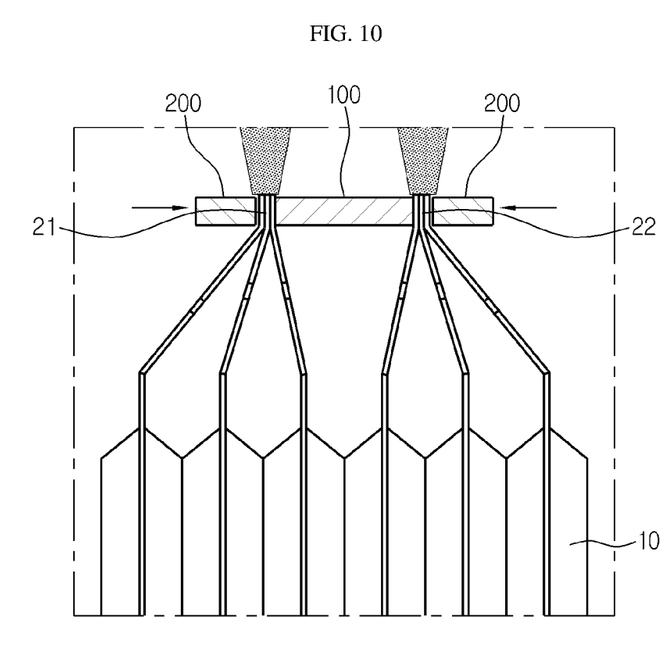

Next, referring to FIGS. 9 and 10, the operation of the bus bar assembly 1 according to the present disclosure and the method of joining the electrode leads 20 will be briefly described. This embodiment is an example in which three battery cells are connected in parallel and the positive electrode leads 21 and the negative electrode leads 22 are joined to the bus bar assembly 1.

First, as shown in FIG. 9, the fitting space S of the bus bar assembly 1 is secured sufficiently. At this time, the fitting space S may be secured sufficiently by interposing the gap keeping protrusion 420 in the space between the gap adjusting portions 220 of the movable bus bar 200, which is formed by pulling the movable bus bar 200 as described above.

Then, the end portions of the positive electrode leads 21 and the end portions of the negative electrode leads 22 are inserted into the fitting space S, respectively. The fitting space S is provided at two places beside both sides of the fixed bus bar 100. Only the end portions of the positive electrode leads 21 and the negative electrode leads 22 are inserted into the fitting spaces S in a bundle, respectively.

After that, as shown in FIG. 10, the pair of movable bus bars 200 are moved close to the fixed bus bar 100 so that the positive electrode leads 21 and the negative electrode leads 22 are adhered to the fixed bus bar 100. More specifically, the gap keeping protrusion 420 is taken out from the space between the pair of movable bus bars 200 by pressing the cantilever beam 430 using the welding jig (not shown). At this time, the pair of movable bus bars 200 are moved in directions facing each other due to the elastic restoration force of the leaf springs 300, and the end portions of the positive electrode leads 21 and the end portions of the negative electrode leads 22 may be integrally compressed between the fixed bus bar 100 the movable bus bar 200. In this state, the positive electrode leads 21 and the negative electrode leads 22 are welded.

According to the structure and operation of the bus bar assembly 1 of the present disclosure, the process of bending the electrode lead 20 is not required at all when the electrode lead 20 is welded, different to the prior art (see FIG. 1). Thus, the manual process for bending the electrode leads 20 may be eliminated to improve the automation ratio of the battery module production line.

In addition, since all of the electrode leads 20 may be welded in a mechanically compressed state, the electrical connectivity and the mechanical bonding strength reliability may be improved regardless of the number of the electrode leads 20 in the parallel connection structure.

Meanwhile, a battery module according to the present disclosure may include the bus bar assembly 1 described above. In addition, the battery module includes a battery cell stack, a module housing for accommodating the battery cell stack, and various devices (not shown) for controlling charging and discharging of the battery cells such as a battery management system (BMS), a current sensor and a fuse. The battery module may be used as an energy source for electric vehicles, hybrid electric vehicles or power storage devices.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may vary based on a location of an observer or an object to be observed.

What is claimed is:

1. A bus bar assembly for electrically connecting a plurality of battery cells having electrode leads, the bus bar assembly comprising:

a fixed bus bar provided in the form of a rod-shaped conductor;

a pair of movable bus bars disposed to be spaced from both sides of the fixed bus bar in a lateral direction with the fixed bus bar being interposed therebetween to form a fitting space respectively between the pair of movable bus bars and the fixed bus bar so that at least one electrode lead can be inserted therein; and an adhering member configured to move the pair of movable bus bars closer to the fixed bus bar when an electrode lead is located in each fitting space so that the electrode leads can be adhered to the fixed bus bar.

2. The bus bar assembly according to claim 1,
wherein each of the pair of movable bus bars includes an adhering portion provided in parallel to the fixed bus bar and gap adjusting portions bent at both side ends of the adhering portion and extending therefrom, and
wherein the pair of movable bus bars are disposed symmetric to each other with the fixed bus bar being interposed therebetween to surround a periphery of the fixed bus bar.

3. The bus bar assembly according to claim 2,
wherein the adhering member is a leaf spring having both ends respectively coupled to the pair of movable bus bars to move the pair of movable bus bars in directions facing each other by an elastic restoration force.

4. The bus bar assembly according to claim 3,
wherein the leaf spring includes a pair of leaf springs, and
wherein both ends of each of the pair of leaf springs are coupled to end portions of the gap adjusting portions, respectively, which face each other at the pair of movable bus bars.

5. The bus bar assembly according to claim 4, further comprising:
a bus bar support frame serving as a plate-shaped structure and having a slit formed at a location corresponding to each fitting space so that the electrode lead can pass therethrough, the bus bar support frame supporting the pair of movable bus bars and the fixed bus bar so that the pair of movable bus bars are movable with respect to the fixed bus bar.

6. The bus bar assembly according to claim 5,
wherein the bus bar support frame includes a gap keeping protrusion configured to be inserted between the gap adjusting portions of the pair of movable bus bars or released therefrom.

7. The bus bar assembly according to claim 6,
wherein the bus bar support frame further includes a cantilever beam having a free end located at the gap adjusting portion, and the gap keeping protrusion is provided at the free end.

8. The bus bar assembly according to claim 7,
wherein the cantilever beam further includes a pressing protrusion protruding at a location spaced apart from the gap keeping protrusion.

9. The bus bar assembly according to claim 5,
wherein the bus bar support frame further includes corner brackets configured to surround and support four corner portions of the pair of movable bus bars in a state where the pair of movable bus bars are spaced farthest from both sides of the fixed bus bar in the lateral direction.

10. A battery module, comprising a bus bar assembly defined in claim 1.

11. The battery module according to claim 10, further comprising a battery cell stack and a module housing for accommodating the battery cell stack.

12. The bus bar assembly according to claim 1, wherein the rod-shaped conductor of the fixed bus bar is made of copper, silver, or tin-plated copper.

13. The bus bar assembly according to claim 1, wherein each of the pair of movable bus bars is made of an insulating material that is different from a material of which the fixed bus bar is made.

* * * * *